Jan. 8, 1952 E. P. G. WRIGHT ET AL 2,581,462

MULTIPULSE VOICE-FREQUENCY CODE SIGNALING CIRCUIT

Filed April 28, 1948 2 SHEETS—SHEET 1

INVENTORS
ESMOND P. G. WRIGHT
MARTINUS DEN HERTOG
BY
Robert Harding Jr.
ATTORNEY INVENTORS
ESMOND P.G. WRIGHT
MARTINUS DEN HERTOG
BY
Robert Harding Jr.
ATTORNEY Patented Jan. 8, 1952

2,581,462

UNITED STATES PATENT OFFICE 2,581,462

MULTIPULSE VOICE-FREQUENCY CODE SIGNALING CIRCUIT

Esmond Philip Goodwin Wright, London, England, and Martinus den Hertog, Antwerp, Belgium, assignors to International Standard Electric Corporation, New York, N. Y.

Application April 28, 1948, Serial No. 23,843
In Great Britain April 29, 1947

6 Claims. (Cl. 179—16)

Figure 1:
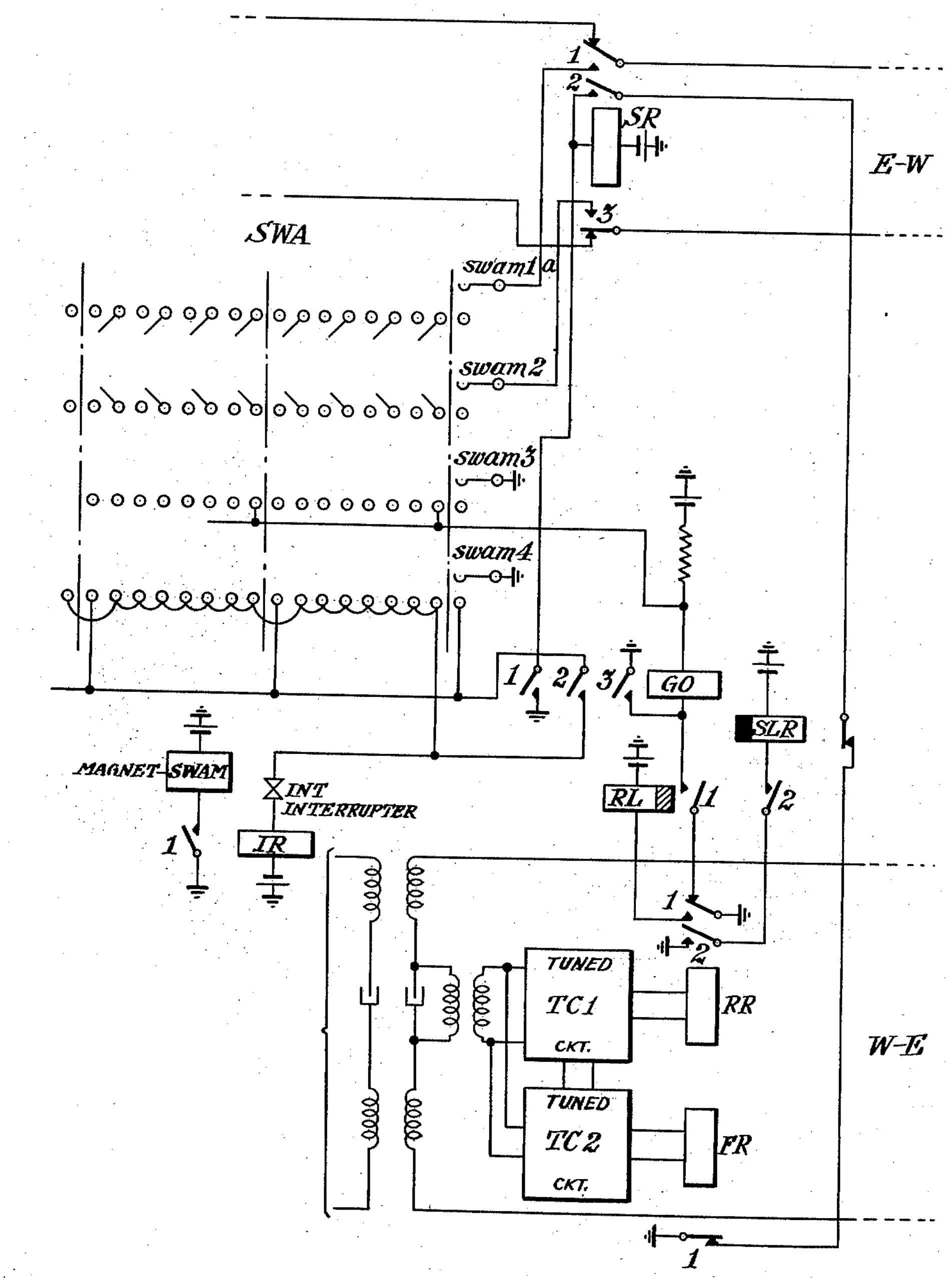

This invention relates to electric signalling systems and particularly but not exclusively to the transmission of signals having a constant number of elements but a variable significance, such as four-element coded digits in automatic telephone systems.

The object of the invention is to obtain reliability of signalling without sacrifice of speed.

One feature of the invention comprises electric signalling equipment comprising means for responding to an incoming signal, and means for transmitting an acknowledgement signal partly or wholly during receipt of an incoming signal.

Another feature of the invention comprises electric signalling equipment comprising means for transmitting a plurality of consecutive signals, means for receiving an acknowledgment signal during transmission of each signal, and means for initiating transmission of a succeeding signal when the acknowledgement signal terminates.

The invention will now be described by reference to its application to digit transmission by 4-pulse voice-frequency code in long-distance, e. g. international, telephone connections.

It is assumed that for the transmission of the numerical codes via the international toll lines, use will be made of a code based on a 4-element time basis. According to this method four impulses will be sent for any figure and each of these four impulses may be either one of two frequencies. With an equal number of impulses it is possible to obtain the certainty that the figure has been completely transmitted and received and it is proposed to provide arrangements whereby each figure is allowed to be transmitted only after an acknowledgement signal has been received that the preceding figure was completely registered at the receiving end. In this way a large amount of safety is obtained and any trouble with the transmission of impulses will immediately result in a failure to proceed instead of in a wrong connection.

This method permits of sending the numerical information at high speed with a very short interdigital time and without requiring synchronous apparatus at sending and receiving ends.

It may be arranged that the backward signal originates when the third pulse arrives and that it is terminated when the incoming register recognises the arrival of the fourth pulse. If there is failure there will be an incomplete backward pulse if three pulses only but not four, have been received, and no pulse if less than three pulses out of four have arrived. With this simultaneous sending it will be possible to take full advantage of decreasing the pause between digits whereas, if the backward signal comes between digits, it may absorb all the time that would have been necessary for a longer pause; e. g. a transmission time of 10 or 15 milliseconds, a receiver response time of 10 milliseconds, and a backward pulse of 25 milliseconds.

Thus receipt of each group of four pulses is acknowledged, the backward pulse being sent while the group is being transmitted. There is no need for a long pause between pulse groups and consequent restriction of speed of transmission, nor will a clipped group result in a wrong connection or tie-up without indication.

The outgoing register in response to an incomplete acknowledge signal or in the absence of such signal may cause any desired operation such as an alarm indicating the digit that has failed, or the toll line may be released and a second attempt made to set up the call.

In the case of a second failure the alarm could be given or a record typed of the failure.

If the acknowledge signal of correct length is received by the outgoing register after, during, or partly after and partly during transmission of a digit, the next digit will then be sent out, or after the transmission of the last digit the normal further operations in setting up the connections will be caused to proceed.

It might be arranged that acknowledgement was complete during, but before the termination of, the corresponding pulse.

There is some danger that the key pulsing signals may be reflected and return on a four wire circuit to the V. F. receiver at the outgoing end.

In such circumstances it would be very difficult to recognise the acknowledgement apart from the reflection unless different frequencies were used.

It may be desirable to use a different frequency combination for the return signals. Compound signals need a rather longer response and will probably involve an acknowledgement 50 milliseconds longer.

Instead of losing this additional time, the acknowledgement could be started at the beginning of the second impulse instead of the third.

Four-pulse non-numerical or supervisory signals used in the same direction as digit transmission will be indistinguishable until the fourth pulse comes in: it is proposed therefore to acknowledge all signals resembling digits.

In certain cases the incoming register will know which is the last digit of a train, in which case it may in response to the last digit send a combined backward end-of-selection signal and acknowledgement signal instead of two separate signals.

It will be appreciated that the significant part of the acknowledgement signals is the termination rather than the beginning or duration.

Figure 2:
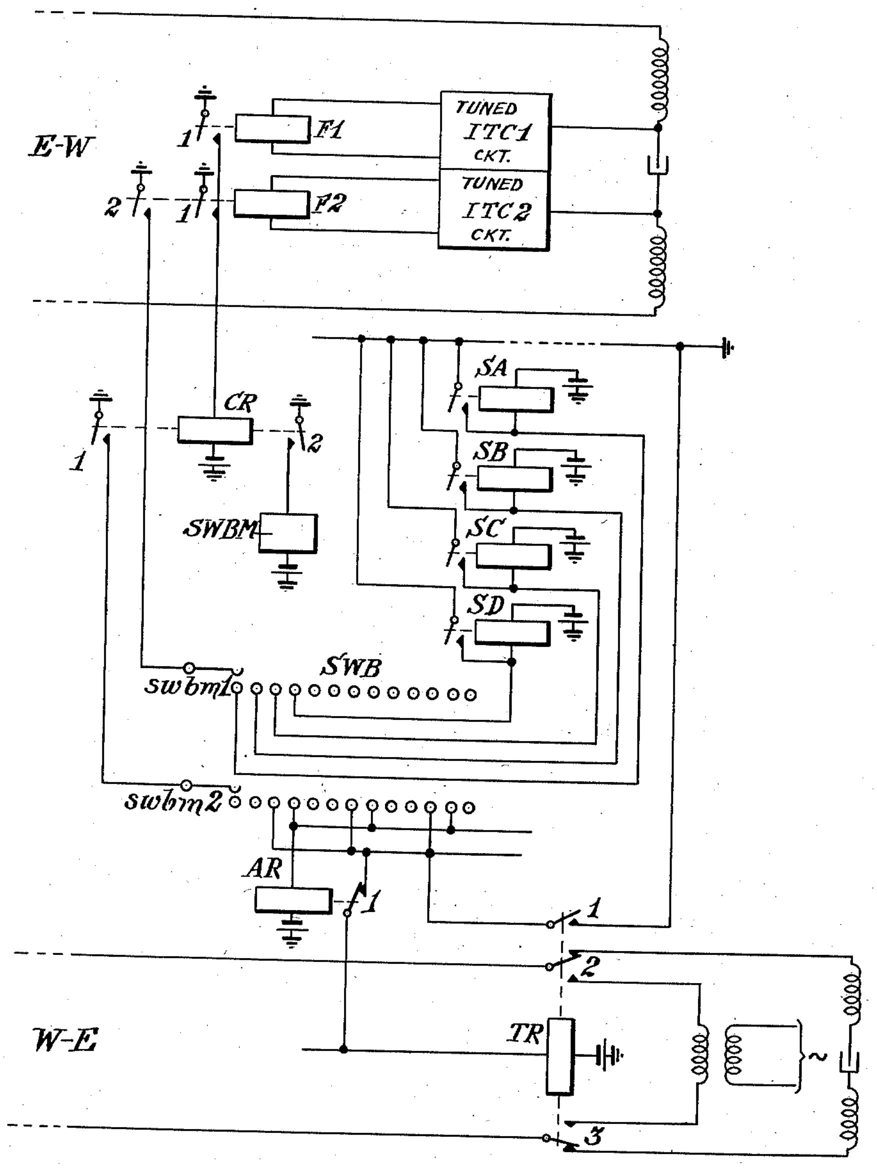

The invention will now be explained in detail with reference to the accompanying drawings in which:

Fig. 1 shows voice frequency signal transmitting and receiving equipment at the outgoing end of a four-wire long distance telephone line, while Fig. 2 shows voice frequency receiving and transmitting equipment at the incoming end of the line.

Only those portions of the circuits are shown which are essential to describing the invention.

The outgoing circuit, Fig. 1, will be seized in well-known fashion and a calling signal sent to the distant end. When the incoming end is ready to receive digits it will in well-known fashion signal back over the W-E line.

The proceed-to-send signal will be received at the outgoing end, Fig. 1 by relay RR via its tuned circuit TC1, tuned circuit TC2 will not pass this signal to relay FR. Earth via *rr1* front operates slow-release relay RL. At the end of the signal earth via *rr1* back, *rl1* front operates relay GO which locks via *go3*. Earth via *go1* energises relay SR which locks via *sr2* front, *fr1* back. Earth via wiper *swam4* of switch SWA, *go2* front, interrupter springs INT of switch SWA energises relay IR which in turn energises the magnet SWAM of switch SWA. The interrupter springs INT are opened by the energisation of magnet SWAM and the magnet releases stepping switch SWA one step in well-known manner.

Relay GO is now short-circuited via the second contact of wiper *swam3* and releases.

Contacts 2 . . . 8 of wiper *swam4* are multipled to interrupter INT so that earth on wiper *swam4* will cause interaction of relay IR and magnet SWAM to step switch SWA seven more steps to contact 9 which is not mulipled to INT. It will be noted that wipers *swam1*, *swam2* are connected via front contacts *sr1*, *sr3* to line. Contacts 2, 4, 6, 8 of wipers *swam1*, 2 are arranged to be connected in well-known manner by a first digit-storage device to sources of frequencies F1, F2 according to the setting of the said device so that while switch SWA is stepping over contacts 2 . . . 8, spaced pulses of frequency will be sent over the E-W line to the incoming end, Fig. 2.

When contacts 9 are reached, switch SWA stops. The incoming end sends an acknowledgement signal in the manner described later, and relay RR will again operate followed by RL and GO.

Switch SWA will be stepped to contact 10 and as before earth via wiper *swam4* will cause relay IR and magnet SWAM to interact and step switch SWA over contacts 10 . . . 17, relay GO again releasing when wiper *swam3* passes contact 10. The second constant total code of frequencies F1, F2 will be sent out during this movement.

Further digits are sent out in the same way. It is assumed that the incoming digit-responsive means can determine when it has received all the digits to be sent, and will send a distinctive acknowledgement and end-of-selection signal. This signal will pass tuned circuit TC2, Fig. 1, but not TC1, and relay FR will be operated instead of RR. The opening of contacts *fr1* releases relay SR and the circuit is back to normal.

Referring now to Fig. 2, the constant total code of four successive spaced pulses of frequencies F1 or F2 respectively operate relays F1, F2, one at a time via their tuned circuits ITC1, ITC2.

At each pulse, earth via contacts 1 of either relay F1 or F2 energises relay CR which in turn operates magnet SWBM of switch SWB. At the end of each pulse CR and SWBM release and switch SWB takes one step. Switch SWB thus takes four steps in response to each four-element constant total digit code. Each set of four positions of SWB over which the switch steps per digit are connected via wiper *swbm1* to relays such as SA, SB, SC, SD.

If relay F2 is operated by a code element, its contact 2 connects earth via wiper *swbm1* to operate the corresponding relay of the SA . . . SD group. Thus when the first digit code has been received, a selection of relays SA . . . SD will be operated and locked.

When, during reception of the first digit code, switch SWB has reached contact 3 and relay CR has operated in response to the third code element, earth via *cr1* front, *swbm2*, *ar1* back, operates relay TR to initiate transmission via *tr2*, 3 of the acknowledgement signal. Relay TR locks via *ar1* back, *tr1* front. When switch SWB is on contact 4 and relay CR operates in response to the fourth code element, earth via *cr1* front, *swbm2* operates relay AR, which opens the circuit of TR at *ar1* and the acknowledgement signal is terminated. It will have been noted that it is the termination of the acknowledgement signal which is operative at the outgoing end.

If the acknowledgement signal is unduly prolonged, earth via *rr2* front, Fig. 1, *rl2* front will operate a slow-to-operate relay SLR which will release relay SR to prevent further transmission and will give an alarm (not shown).

It will be arranged that the third contact of the last set of four contacts of wiper *swbm2* corresponding to the last digit to be received will be connected to a relay (not shown) other than relay TR to initiate an acknowledgement and end-of-selection signal instead of an acknowledgement signal.

What is claimed is:

1. An electric signalling system comprising a calling station, a called station, circuit means connecting said calling and called stations, means at said calling station for transmitting a multi-element constant total signal to said called station, means at said called station for receiving said signal, control means at said called station operative to transmit an acknowledgement signal to said calling station, and means controlled by the elements of said signal for operating said control means when the penultimate element of a signal is received by said receiving means.

2. An electric signalling system as claimed in claim 1 and further comprising means at said calling station for initiating transmission of a succeeding signal when the acknowledgement signal terminates.

3. The electric signalling system as claimed in claim 1 wherein said multi-element constant total signal comprises a four element coded digit, and said transmitting means at said calling station includes means for transmitting a plurality of different voice frequency impulses for each element.

4. In an electric signalling system as claimed in claim 1 wherein said multi-element constant total signal comprises a four element coded digit, each element of which comprises not more than two different voice frequency impulses.

5. The electric signalling system as claimed in claim 3 wherein said control means at said called station is operative to transmit said acknowledgement signal in response to receipt of the third element of a transmitted signal at said called station and means at said called station for terminating transmission of said acknowledgement signal upon receipt of said fourth element of a transmitted signal.

6. The electric signalling system as claimed in claim 1 wherein said control means includes means operable to terminate said acknowledgement signal upon receipt of the final element of said multi-element constant total signal at said called station.

ESMOND PHILIP GOODWIN WRIGHT.
MARTINUS DEN HERTOG.

REFERENCES CITED

The following references are of record in the file of this patent:

UNITED STATES PATENTS

| Number | Name | Date |
|---|---|---|
| 2,424,577 | Mauge | July 29, 1947 |

FOREIGN PATENTS

| Number | Country | Date |
|---|---|---|
| 485,635 | Great Britain | May 20, 1938 |
| 560,794 | Great Britain | Apr. 20, 1944 |
| 584,677 | Great Britain | Jan. 21, 1947 |